Dec. 24, 1940.  V. MILICH  2,225,753
CASTER
Filed Sept. 23, 1937
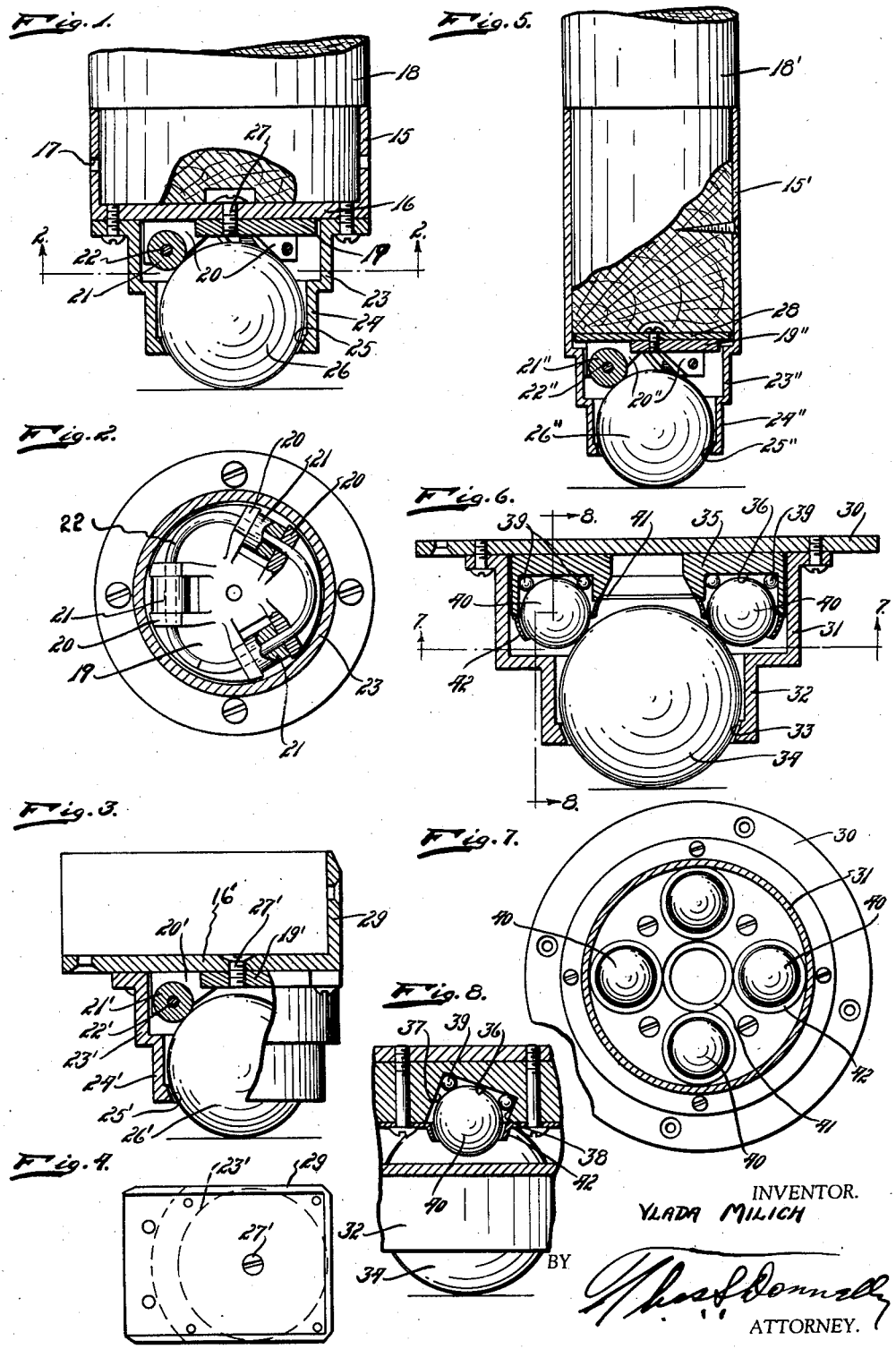
INVENTOR.
VLADA MILICH
BY
ATTORNEY.

Patented Dec. 24, 1940

2,225,753

UNITED STATES PATENT OFFICE 2,225,753

CASTER

Vlada Milich, Detroit, Mich.

Application September 23, 1937, Serial No. 165,293

1 Claim. (Cl. 16—26)

My invention relates to a new and useful improvement in a caster and has for its object, the provision of a caster which will be simple in structure, economical of manufacture, durable, easily and quickly assembled and highly efficient in use.

Another object of the invention is the provision of a caster having a rotatable contact member engaging rotatable abutment members for reducing the frictional resistance to the rotation of the rotatable contact member.

Another object of the invention is the provision of a caster having a rotatable contact member mounted in a suitable retainer adapted also for receiving a holding plate which serves to hold anti-friction members.

Other objects will appear hereinafter.

The invention consists in the combination and arrangement of parts hereinafter described and claimed.

The invention will be best understood by a reference to the accompanying drawing which forms a part of this specification, and in which, Fig. 1 is a central, vertical, sectional view of the invention.

Fig. 2 is a sectional view taken on line 2—2 of Fig. 1.

Fig. 3 is a view similar to Fig. 1 of a slightly modified form.

Fig. 4 is a top plan view of the form shown in Fig. 3.

Fig. 5 is a central, vertical, sectional view of a further modified form.

Fig. 6 is a central, vertical, sectional view of a further modified form.

Fig. 7 is a sectional view taken on line 7—7 of Fig. 6.

Fig. 8 is a fragmentary, sectional view taken on line 8—8 of Fig. 6.

In the form shown in Fig. 1, the invention comprises a cup-shaped supporting member 15 having a base 16 and adapted for the reception of one end of a leg 18 projecting from a table, bed, chair or the like. Openings 17 are formed in the member 15 for the reception of screws which may be threaded into the leg 18 to mount the supporting member thereon. Mounted, by means of the screw 27, on the under surface of the base or bottom 16 is a holding plate 19. Projecting outwardly from the lower face of the plate 19 are spaced lugs 20 between which are positioned rollers 21. A retainer 22 in the form of a wire is projected through the lugs 20 and through the rollers 21 to rotatably mount these rollers in position between the lugs.

Mounted on the bottom 16 is a cup-shaped retainer 23 having its lower portion 24 reduced in diameter and provided, adjacent its end, with the inwardly projecting bead having the tapered surface 25 against which may engage the ball or rotatable contact member 26 which is mounted in the retainer. The beveled surface 25 prevents the dislodgement of the ball 26 from the retainer 23. In use, when the ball is placed under pressure, it will engage against the rollers 21 and, as shown in Fig. 2, these rollers 21 are positioned about the plate 19 in such a manner as to engage the ball 26 at several points. Thus, the frictional resistance to the rotation of the ball 26 is considerably lessened over what would be exerted were the ball to press against the bottom 16.

In the form shown in Fig. 3 and Fig. 4, I provide a trough-shaped member 29 which is designed for mounting on the leg of the article with which used. Mounted on the bottom 16' of this supporting member 29, by means of the screw 27', is a holding plate 19' having the spaced lugs 20' between which are mounted on the wire retainer 22', the rollers 21'. Mounted on the bottom 16' is a retainer 23' having the reduced portion 24' and provided with the bead having the inclined surface 25' to retain the ball 26' in position. The construction shown in Fig. 3 and Fig. 4 is substantially the same as shown in Fig. 1, excepting the supporting member is of a different design.

In Fig. 5, the leg 18' engages in a sleeve 15' which is formed integral with the retainer 23" having the reduced portion 24" and provided at its lowers end with the bead having the inclined surface 25" adapted to engage the ball 26". The rollers 21" are mounted on the wire 22" by the lugs 20", these lugs projecting downwardly from the plate 19". This plate 19" is attached to a guide plate 28 which is loosely positioned in the sleeve 15'. In the forms shown in Fig. 1 and Fig. 3, the plate 19 or 19' would be secured to the bottom 16 or 16' by means of the screw 27 or 27' prior to mounting on the leg 18. In the form shown in Fig. 5, the retaining plate 19" is screwed to the guide plate 28 and this is merely dropped in the sleeve 15' to rest upon the shoulder between the sleeve 15' and the retainer 23".

In the remaining figures I have shown a slightly different form in which a plate 30 is provided which may be attached by screws or in any other suitable manner, to the leg of a body to be supported. Secured to the plate 30 by screws is a retaining plate 35 in which is formed a plurality of pockets 36. The base of these pockets is inclined to the plane of the plate 35 so that the side walls 37 of these pockets are inclined to the axis of the plate 35. Positioned in each of these pockets is a large ball 40 engaging against smaller balls 39 positioned in the pockets. A retaining ring 41 is provided with the outwardly flared portions 42 at each of the pockets 36 to retain the balls 40 in position. Embracing this plate 35 and secured to the plate 30 is a retainer 31 having the reduced portion 32 and provided at its open end with an inwardly projecting bead provided with the inclined surface 33 for engaging the ball 34 and retaining it in position in the retainer. This ball 34, upon pressure being exerted thereon, engages against the ball 40 so that a minimum frictional resistance is offered to a rotation of the ball 34.

In this way, I have provided a caster which is possessed of maximum efficiency. The contact balls freely rotating under very excessive loads so that a marring or scratching of the surface over which these balls are dragged is eliminated. Furthermore, this construction makes it possible to form the contact balls 34 from rubber or other yieldable material. The contact balls 26 may also be formed from glass or a hard composition, the mountings being such that they will freely rotate due to the lessening of the frictional contact.

This construction is also one which affords a means for economical manufacture. The construction is such that with the exception of the balls used in the device, the entire structure may be made from stampings, thus affording a light as well as cheap and durable structure.

The mounting of the contact balls is also such that they will freely rotate regardless of expansion and contraction of the contact balls, due to temperature changes.

While I have illustrated and described the preferred form of construction, I do not wish to limit myself to the precise details of structure shown, but desire to avail myself of such variations and modifications as may come within the scope of the appended claim.

What I claim as new is:

A caster of the class described, comprising: a supporting member; a plate fixedly mounted on said supporting member and having a plurality of pockets formed in its outer face and axially directed angularly of the plane of said plate; an antifriction member mounted in each of said pockets; a retaining ring having an opening formed therein at each of said pockets, said ring being flared outwardly at each of its openings for permitting the projection of an antifriction member outwardly beyond said ring; a cup-shaped retainer mounted on said supporting member and having a central opening formed in its base; and a curvilinear contact member positioned in said cup-shaped retainer and engaging said antifriction members and projecting outwardly through the opening formed in the base of said cup-shaped retainer, said contact member being, while in engagement with said antifriction member, out of contact with said retainer and being normally withdrawable from said retainer.

VLADA MILICH.